United States Patent
Watanabe

(10) Patent No.: US 9,503,590 B2
(45) Date of Patent: Nov. 22, 2016

(54) IMAGING APPARATUS, METHOD OF CONTROLLING IMAGING APPARATUS, AND PROGRAM

(71) Applicant: CANON KABUSHIKI KAISHA, Tokyo (JP)

(72) Inventor: Satoshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/072,681

(22) Filed: Mar. 17, 2016

(65) Prior Publication Data

US 2016/0255217 A1 Sep. 1, 2016

Related U.S. Application Data

(63) Continuation of application No. 14/328,601, filed on Jul. 10, 2014, now Pat. No. 9,325,865.

(30) Foreign Application Priority Data

Jul. 12, 2013 (JP) ................ 2013-146869

(51) Int. Cl.
*H04N 1/00* (2006.01)
*H04N 5/77* (2006.01)
*H04N 5/232* (2006.01)
*H04N 5/235* (2006.01)

(52) U.S. Cl.
CPC ...... *H04N 1/00278* (2013.01); *H04N 1/00307* (2013.01); *H04N 5/2355* (2013.01); *H04N 5/2356* (2013.01); *H04N 5/23206* (2013.01); *H04N 5/23245* (2013.01); *H04N 5/772* (2013.01); *H04N 2201/0084* (2013.01)

(58) Field of Classification Search
None
See application file for complete search history.

(56) References Cited

U.S. PATENT DOCUMENTS

| | | |
|---|---|---|
| 5,687,302 A | 11/1997 | Kawase |
| 6,046,769 A | 4/2000 | Ikeda et al. |
| 7,424,200 B2 | 9/2008 | Nishijima et al. |
| 7,720,348 B2 * | 5/2010 | Fujinami ............... H04N 5/765 386/230 |
| 8,009,220 B2 | 8/2011 | Kogusuri |
| 8,079,053 B2 | 12/2011 | Yampanis et al. |
| 8,103,839 B2 | 1/2012 | Takatsuka |
| 8,421,886 B2 | 4/2013 | Tsuda |
| 8,521,692 B1 | 8/2013 | Ogata |
| 9,025,935 B2 | 5/2015 | Ishihara |
| 9,058,148 B2 | 6/2015 | Taniguchi |
| 9,064,324 B2 | 6/2015 | Ooguni |
| 9,088,761 B2 | 7/2015 | Chang |
| 2001/0030692 A1 | 10/2001 | Yoneda |

(Continued)

FOREIGN PATENT DOCUMENTS

JP 2001-320626 A 11/2001

*Primary Examiner* — Michael Osinski
(74) *Attorney, Agent, or Firm* — Carter, DeLuca, Farrell & Schmidt, LLP

(57) ABSTRACT

In an imaging apparatus, when a user selects a smart phone mode while a communication function menu screen is displayed, a control unit controls a communication unit to perform a connection operation to an information processing apparatus such as a smart phone. If the user selects a printer mode while the communication function menu screen is displayed, the apparatus determines the current photographing mode. If the current photographing mode is a specific photographing mode, the apparatus displays a printer connection disenabled screen to inhibit connection with the printer.

16 Claims, 6 Drawing Sheets

(56) References Cited

U.S. PATENT DOCUMENTS

| | | |
|---|---|---|
| 2002/0018054 A1 | 2/2002 | Tojima et al. |
| 2002/0051065 A1 | 5/2002 | Takahashi |
| 2002/0118894 A1 | 8/2002 | Morimoto et al. |
| 2003/0077064 A1 | 4/2003 | Katayama |
| 2004/0047002 A1 | 3/2004 | Nishi |
| 2004/0100565 A1 | 5/2004 | Chen et al. |
| 2005/0270579 A1 | 12/2005 | Hibi et al. |
| 2006/0274971 A1 | 12/2006 | Kumazawa et al. |
| 2007/0159652 A1 | 7/2007 | Sato |
| 2007/0171916 A1 | 7/2007 | Matsutani |
| 2008/0180551 A1 | 7/2008 | Koike |
| 2008/0260294 A1 | 10/2008 | Ogata |
| 2009/0073490 A1 | 3/2009 | Kawata et al. |
| 2009/0262201 A1 | 10/2009 | Kuwata et al. |
| 2009/0274365 A1 | 11/2009 | Tsuda et al. |
| 2010/0194765 A1 | 8/2010 | Nakamura |
| 2011/0292439 A1 | 12/2011 | Nagata et al. |
| 2011/0309921 A1 | 12/2011 | Tachibana |
| 2012/0031968 A1 | 2/2012 | Ohsugi |
| 2012/0191601 A1 | 7/2012 | Yoshida |
| 2012/0206470 A1 | 8/2012 | Frank et al. |
| 2014/0106804 A1 | 4/2014 | Sakamoto et al. |
| 2014/0198331 A1 | 7/2014 | Bin et al. |
| 2014/0372390 A1 | 12/2014 | Matsuzawa et al. |
| 2015/0036734 A1 | 2/2015 | Hendry et al. |

* cited by examiner

IMAGING APPARATUS, METHOD OF CONTROLLING IMAGING APPARATUS, AND PROGRAM

CROSS REFERENCE TO RELATED APPLICATIONS

This application is a continuation of U.S. patent application Ser. No. 14/328,601, filed Jul. 10, 2014, which claims the benefit of and priority to Japanese Patent Application No. 2013-146869, filed Jul. 12, 2013, the entire contents of each of which are hereby incorporated by reference herein in their entireties.

BACKGROUND OF THE INVENTION

1. Field of the Invention

The present invention relates to an imaging apparatus suitably used for restricting functions in accordance with a photographing mode, a method of controlling the imaging apparatus, and a program.

2. Description of the Related Art

Recently, there is widely known an imaging apparatus which is arranged such that in a case where the imaging apparatus is operating in a give specific photographing mode, functions other than those for a given specific photographing mode are restricted. For example, Japanese Patent Application Laid-Open No. 2001-320626 discloses an imaging apparatus which stops or restricts a plurality of functions that consume power, including a function for connection with an external device, while maintaining the minimum functions required for the imaging apparatus when a power-saving photographing mode is selected.

Restricting functions at the time of a specific photographing mode will produce effects such as suppressing power consumption and simplifying operations for the user. On the other hand, recently, there is known an imaging apparatus which has both a function of performing photographing in a photographing mode requiring a large memory capacity and a function for connection with an external device which also requires a large memory capacity. Such an imaging apparatus sometimes needs to perform exclusive control of the memory to activate one function while the other function is active.

For example, there is conceivable an imaging apparatus which has both a photographing function requiring a large memory capacity like a photographing mode for combining a plurality of images and a printing function using a printer, which requires a large memory capacity to generate print data. When using such an imaging apparatus, the apparatus needs to have a larger memory capacity to simultaneously activate the above two functions. In a system having a limited memory capacity, the two functions need to share the memory.

In addition, in an imaging apparatus using a system which shares a memory in this manner, a photo opportunity may occur after a memory for generating print data is reserved. When photographing at this timing in a photographing mode for combining a plurality of images, it is necessary, first of all, to perform processing such as releasing the reserved memory to generate print data. After this releasing processing is performed, a memory capacity for photographing is reserved. As described above, in some case, it takes much time to reserve a memory capacity for photographing, resulting in difficulty in photographing at the timing desired by the user.

SUMMARY OF THE INVENTION

An aspect of the present invention is to solve all or at least one of the above problems.

In addition, according to one aspect of the present invention, an imaging apparatus comprises an imaging unit, a memory configured to store image data generated by the imaging unit, a controller configured to control a plurality of photographing modes including at least a first photographing mode for photographing one image in accordance with one photographing instruction by using the imaging unit and a second photographing mode using a larger storage area of the memory than in the first photographing mode, and a communication unit configured to communicate with an external apparatus by using data in the memory, wherein the communication unit is arranged to be disenabled to establish communication with the external apparatus in a case where the controller effects control in the second photographing mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Preferred embodiments of the present invention will now be described in detail in accordance with the accompanying drawings.

Figure 1:
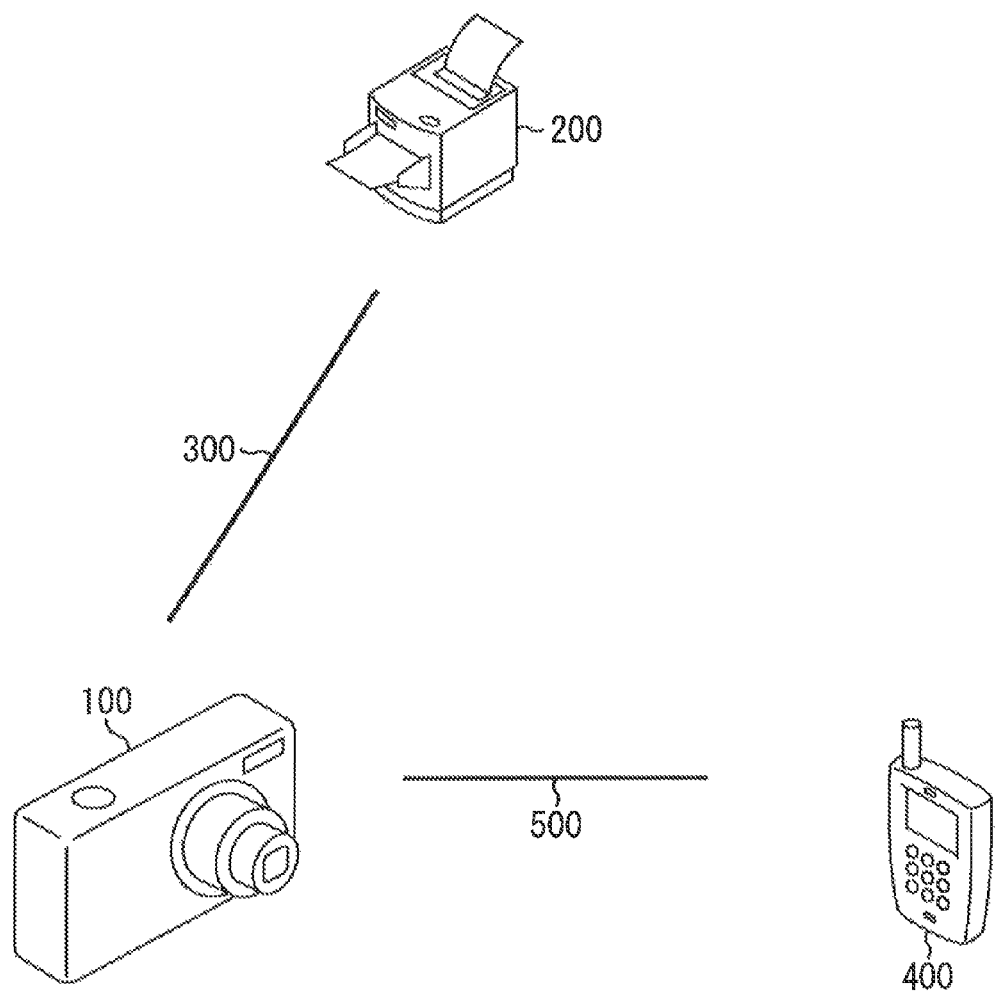
FIG. 1 is a view showing an example of the arrangement of a communication system according to an embodiment.

FIG. 1 is a view showing an example of the arrangement of a communication system according to this embodiment.

As shown in FIG. 1, an imaging apparatus 100 according to this embodiment can be connected to a printer 200 via a network 300, and can be further connected to an information processing apparatus 400 via a network 500. The information processing apparatus 400 is a personal computer, portable telephone, smart phone, so-called tablet device, or the like.

The imaging apparatus 100 according to this embodiment has a function capable of selecting whether to establish connection with the printer 200 via the network 300 or establish connection with the information processing apparatus 400 via the network 500. The embodiment will exemplify a case in which wireless LANs are used as the networks 300 and 500. Note that the networks which can be used as the networks 300 and 500 are not limited to wireless LANs. For example, a network using an infrared communication or a network using BlueTooth® may be used as the network 300. Alternatively, other types of wired networks may be used.

Figure 2:
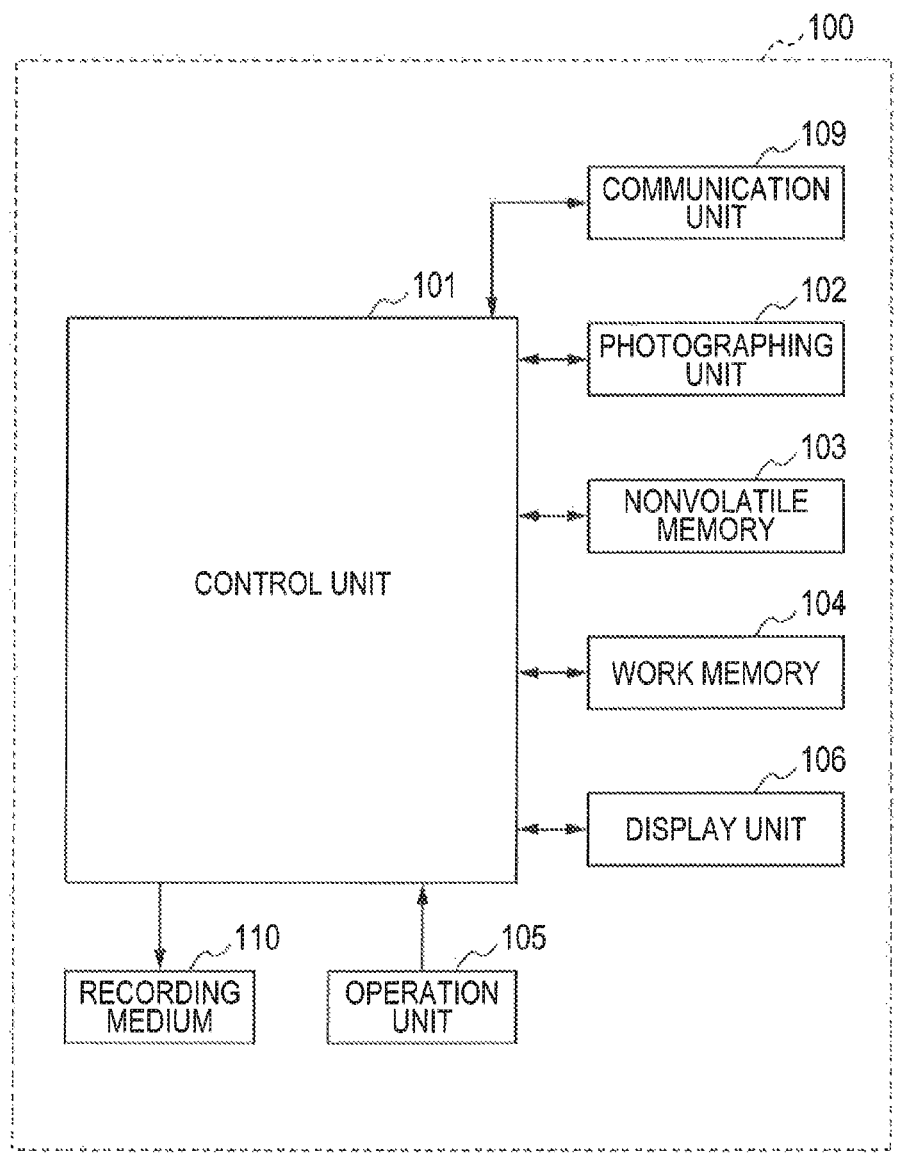
FIG. 2 is a block diagram showing an example of the internal arrangement of an imaging apparatus according to the embodiment.

FIG. 2 is a block diagram showing an example of the internal arrangement of the imaging apparatus 100 according to this embodiment.

Referring to FIG. 2, a control unit 101 controls the respective units of the imaging apparatus 100 in accordance with input signals and programs (to be described later). Note that the overall imaging apparatus 100 may be controlled by assigning parts of processing to a plurality of pieces of hardware instead of making the control unit 101 control the overall imaging apparatus 100. The imaging apparatus 100 in the embodiment can acquire image data by making the control unit 101 control a photographing unit 102 (to be described later).

The control unit 101 also has a display control function of making a display unit 106 display a menu screen in accordance with an operation of an operation unit 105. The menu screen is a screen to be displayed on the display unit 106 by the control unit 101 when the user presses a menu button on the operation unit 105 (to be described later). An ordinary menu screen displays a menu containing photographing mode options, size options of image data to be acquired, communication function options, and brightness options of the display unit 106, options of languages to be displayed, and the like. The user can change and execute such options by operating the operation unit 105.

The photographing unit 102 performs image pickup processing. The image pickup processing is the processing of converting the object light image formed by the lens included in the photographing unit 102 into an electrical signal, performing noise reduction processing and the like to the electrical signal and outputting digital data as image data. The image data generated by image pickup is stored in a buffer memory as a work memory 104. The control unit 101 then performs a predetermined computation for the data. The resultant data is recorded in a recording medium 110.

A nonvolatile memory 103 is a nonvolatile memory capable of electrically erasing and recoding data, and stores programs and the like (to be described later) to be executed by the control unit 101. The work memory 104 is a buffer memory which temporarily holds the image data generated by the photographing unit 102 or a memory functioning as an image display memory for the display unit 106. In addition, the work memory 104 functions as a buffer memory which temporarily holds data when exchanging it with the printer 200 or the information processing apparatus 400 via a communication unit 109 and a work area for the control unit 101.

The user operates the operation unit 105 to issue an instruction to operate the imaging apparatus 100. The operation unit 105 includes, for example, a power button for issuing an instruction to turn on/off the power supply of the imaging apparatus 100 and a release switch for accepting an instruction to perform image pickup processing. The operation unit 105 also includes a menu button for displaying the above menu screen and operation members such as a four-way operational key and a touch panel which accept operations during the display of the screen.

The display unit 106 displays a live view image at the time of image pickup, an image generated by an imaging instruction, characters for an interactive operation, and the like. In this embodiment, the control unit 101 controls the display unit 106 to continuously display the image data output from the photographing unit 102 as a live view image while sequentially updating it. With this operation, images associated with the image data generated by the photographing unit 102 are sequentially displayed on the display unit 106 in real time. Note that the imaging apparatus 100 need not be equipped with the display unit 106. The imaging apparatus 100 may be capable of being connected to the display unit 106 such as a display device and have at least a display control function which controls the display of the display unit 106.

The communication unit 109 is a connection unit for communicating with external devices. The imaging apparatus 100 according to this embodiment can exchange data with the printer 200 and the information processing apparatus 400 via the communication unit 109. In this embodiment, the communication unit 109 is a wireless communication unit. The control unit 101 can wirelessly communicate with the printer 200 and the information processing apparatus 400 via an antenna. Note that the communication unit 109 is also used when the imaging apparatus 100 is connected to, for example, a network such as the Internet.

The control unit 101 performs recording processing to record the image data output from the photographing unit 102 in the recording medium 110. Note that the recording medium 110 may be a medium detachable from the imaging apparatus 100 or a medium built in the imaging apparatus 100.

The photographing modes of the imaging apparatus 100 will be described next. The imaging apparatus 100 according to this embodiment can perform photographing in a plurality of photographing modes such as a manual photographing mode and an automatic photographing mode. Of these modes, photographing modes for photographing a plurality of images include a handheld night scene mode, an HDR back-light correction mode, a multi-shot noise reduction mode, a multi-exposure mode, and a panorama combining mode for generating a horizontal or vertical image. This embodiment will exemplify the HDR back-light correction mode as a photographing mode for photographing a plurality of images. Assume that in an ordinary photographing mode, one image is generated by one photographing operation and recorded in the recording medium 110.

The HDR back-light correction mode is a mode for continuously photographing three images with different brightness levels by one photographing operation and generating one image having wide-range gradation with a suppressed blocked up shadow by combining the three photographed images, and recording the generated image in the recording medium 110. As described above, the HDR back-light correction mode is a mode requiring to reserve, in the work memory 104, a work area having a large capacity to combine images. This mode requires reserving a large memory capacity to hold a combined image as well as a plurality of photographed images.

The communication functions of the imaging apparatus 100 will be described next. The imaging apparatus 100 according to this embodiment has a printer mode for connection with the printer 200 via the network 300 and a smart phone mode for connection with the information processing apparatus 400 via the network 500. In a case where connected to the printer 200 in the printer mode, the imaging apparatus 100 generates print data from the image data recorded in the recording medium 110 in accordance with the PictBridge standard, and transmits the print data to the printer 200 as a transmission destination. The printer 200 has a print function based on the PictBridge standard, and can print the data received from the imaging apparatus 100 via the network 300. When connected to the information processing apparatus 400 in the smart phone mode, the information processing apparatus 400 can acquire the image data recorded in the recording medium 110 in accordance with the PTP protocol.

As described above, unlike in the smart phone mode, in the printer mode, it is necessary to reserve a work area with a large capacity in the work memory 104 to generate print data. In addition, in the work memory 104, a storage area reserved to combine images in the HDR back-light correction mode and a storage area reserved to generate print data in the printer mode are an overlapping common area. Although this embodiment has exemplified the printer mode as an example using a larger memory than in the ordinary communication mode, the embodiment can be applied to any mode other than the printer mode as long as the mode uses a larger memory capacity than the ordinary communication mode.

Figure 3:
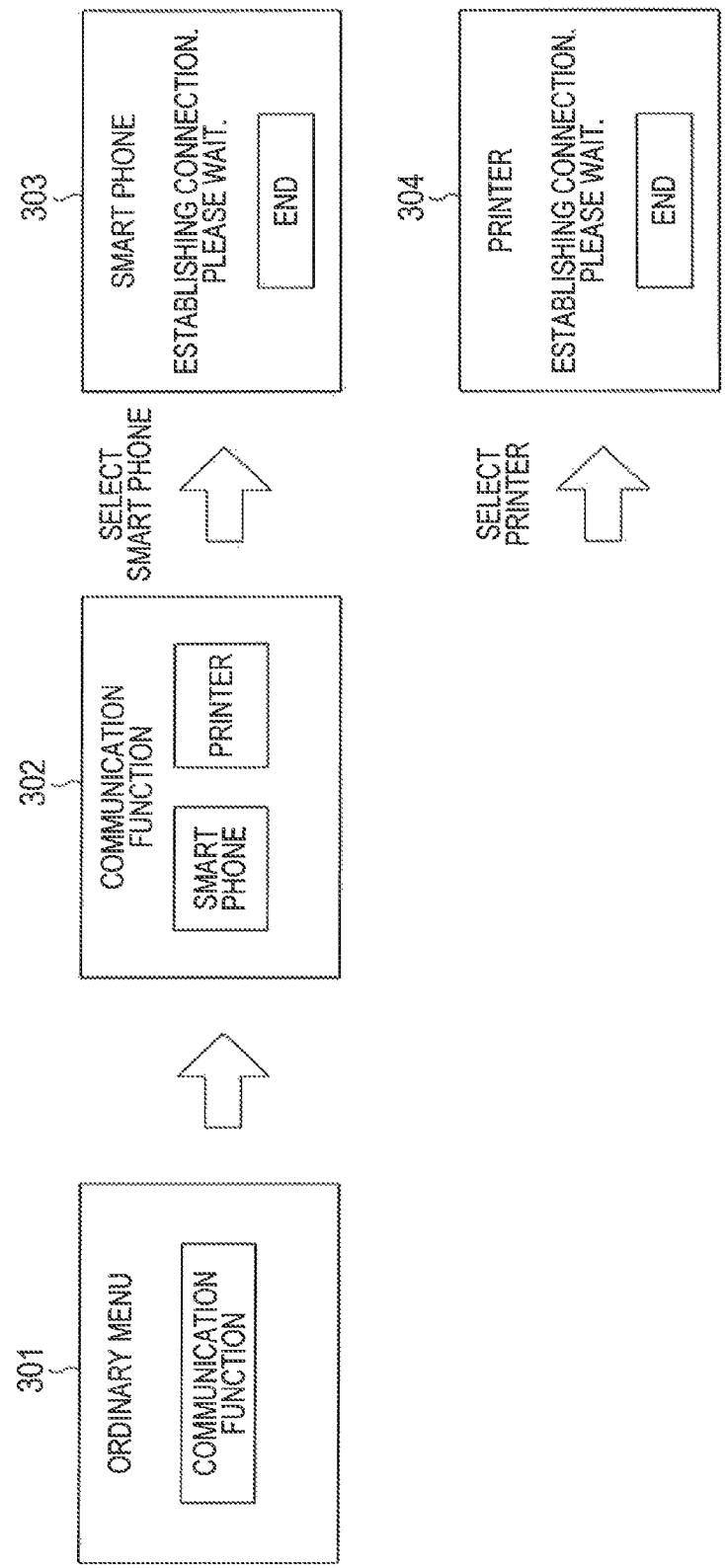
FIG. 3 is a view showing an example of a UI (user interface) displayed when a communication function is selected in an ordinary photographing mode.

An example of displaying a selection screen for the communication functions of the imaging apparatus 100 on the display unit 106 will be described next. FIG. 3 is a view showing an example of the UI displayed on the display unit 106 when the user operates the operation unit 105 of the imaging apparatus 100 in an ordinary photographing mode such as the manual photographing mode or the automatic photographing mode.

A screen 301 shown in FIG. 3 is a screen to be displayed on the display unit 106 by the control unit 101 when the user depresses the menu button of the operation unit 105. When the communication function is selected according to a user operation while the screen 301 is displayed, the current screen changes to a communication function menu screen 302. On the communication function menu screen 302, the user selects the smart phone mode or printer mode as a communication mode by operating the operation unit 105.

When the user selects the smart phone mode or printer mode, the control unit 101 controls the communication unit 109 to perform a connection operation to the smart phone or printer in accordance with the connection destination selected by the user. At this time, the control unit 101 effects control to display a smart phone connection establishing screen 303 or a printer connection establishing screen 304 on the display unit 106 in accordance with the connection destination.

Figure 4:
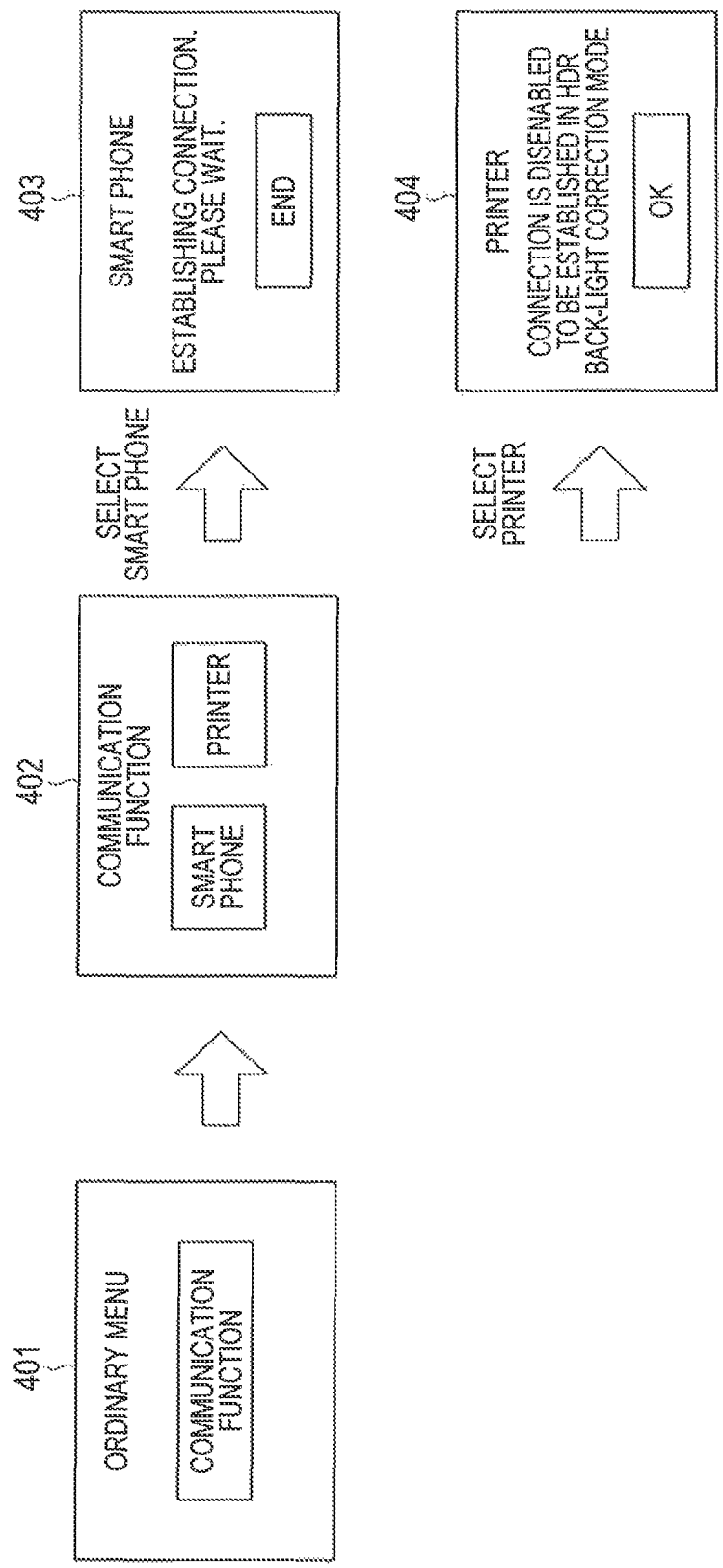
FIG. 4 is a view showing an example of the UI displayed when the communication function is selected in an HDR (High Dynamic Range) back-light correction mode.

FIG. 4 is a view showing an example of the UI displayed on the display unit 106 when the user operates the operation unit 105 of the imaging apparatus 100 while the HDR back-light correction mode is selected as a photographing mode.

Like the screen 301 shown in FIG. 3, a screen 401 shown in FIG. 4 is a screen to be displayed on the display unit 106 by the control unit 101 when the user presses the menu button of the operation unit 105. When the communication function is selected according to a user operation while the screen 401 is displayed, the current screen changes to a communication function menu screen 402. On the communication function menu screen 402, like on the communication function menu screen 302 shown in FIG. 3, the user selects the smart phone mode or printer mode as a communication mode by operating the operation unit 105.

In a case where the user selects the smart phone mode while the communication function menu screen 402 is displayed, the control unit 101 controls the communication unit 109 to perform a connection operation to the information processing apparatus 400. The control unit 101 then effects control to display a smart phone connection establishing screen 403 on the display unit 106. In a case where the user selects the printer mode while the communication function menu screen 402 is displayed, the control unit 101 displays a printer connection disenabled screen 404 on the display unit 106 to inhibit connection with the printer 200.

As shown in FIG. 4, the memory area required to store images photographed in the HDR back-light correction mode and the combined image is common to the memory area required to store print data when a print instruction is issued, and hence exclusive control is performed. This obviates the necessity to perform the processing of releasing the memory area reserved to save print data at a photo opportunity in the HDR back-light correction mode and hence prevents the user from losing a photo opportunity.

Figure 5:
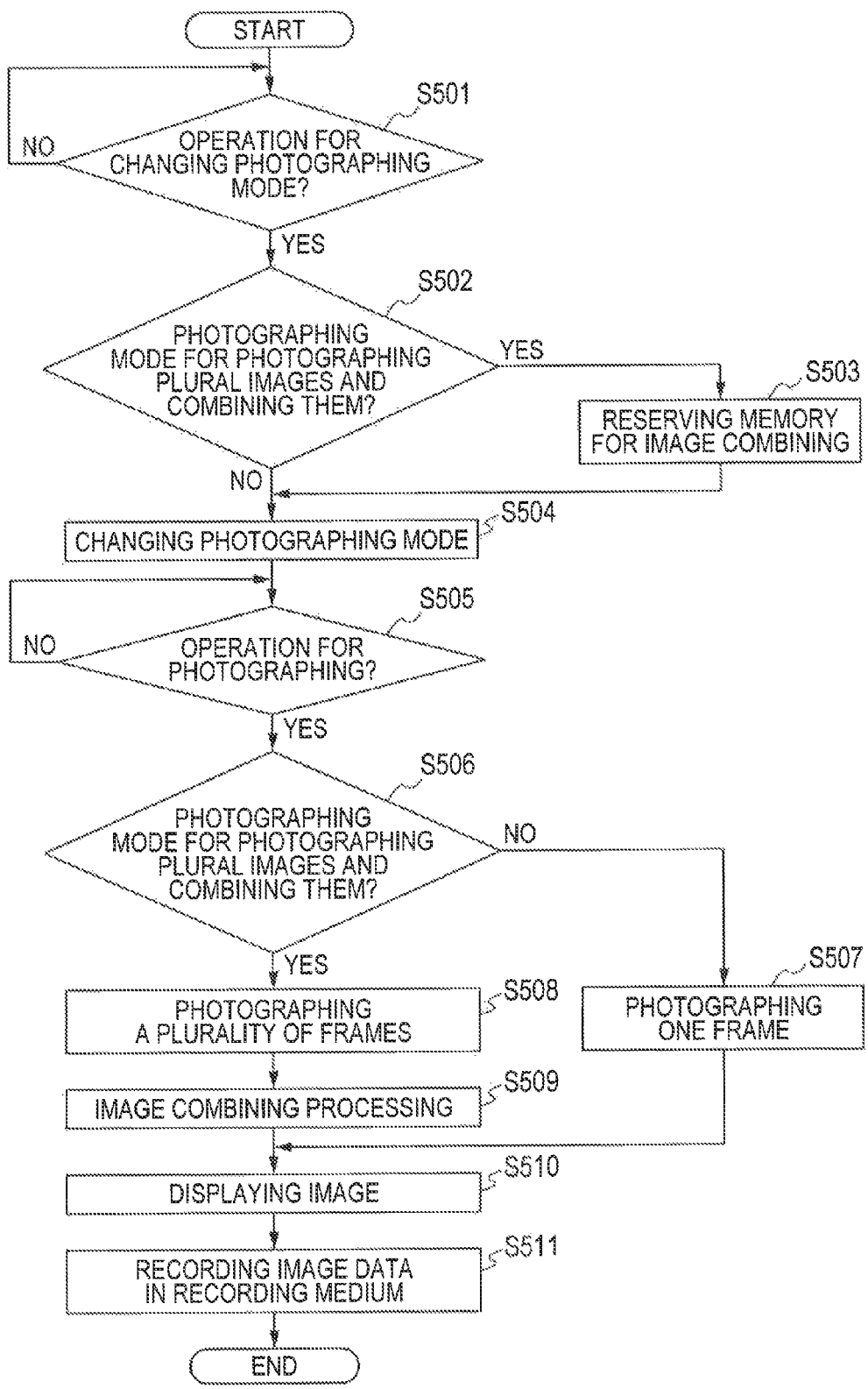
FIG. 5 is a flowchart showing an example of a processing procedure to be performed when a photographing operation is performed after a changing operation is performed in a photographing mode according to the embodiment.

A control method using the imaging apparatus 100 will be described next with reference to FIGS. 5 and 6. FIG. 5 is a flowchart showing an example of a processing procedure to be performed in a case where a photographing operation is performed after a photographing mode is changed. Note that the control unit 101 effects control to perform each processing shown in FIG. 5.

First of all, in step S501, the operation unit 105 stands by until the reception of an instruction to change the photographing mode from the operation unit 105. When an instruction to change the photographing mode is issued, the process advances to step S502.

In step S502, it is determined whether the photographing mode after the change is a photographing mode for photographing a plurality of images and combining them, such as the HDR back-light correction mode. The photographing mode determined in this determination is the above photographing mode. If this determination result indicates that the determined mode is the photographing mode for photographing a plurality of images and combining them, the process advances to step S503. If the determined mode is the ordinary photographing mode other than the above mode, the process advances to step S504.

In step S503, a work memory area necessary to combine images is reserved in the work memory 104, and the process advances to step S504. The work memory area reserved in this case is common to a memory area for the generation of print data (to be described later). Note that if a memory area to be reserved is being used by the processing performed by another function of the imaging apparatus 100, the memory area is released upon interruption of the processing, and memory area reservation processing is performed. In step S504, the current mode is changed to the instructed photographing mode.

In step S505, the operation unit 105 stands by until the reception of a photographing instruction from the operation unit 105. Upon reception of a photographing instruction from the operation unit 105, the process advances to step S506. It is determined in step S506 whether the current photographing mode is a photographing mode for photographing a plurality of images and combining them, such as the HDR back-light correction mode. If it is determined that the current photographing mode is a photographing mode for photographing a plurality of images and combining them, the process advances to step S508. If the current photographing mode is an ordinary photographing mode other than the above mode, the process advances to step S507. In step S507, the photographing unit 102 performs image pickup processing once, and the process advances to step S510. Assume that when ordinary continuous photographing is to be performed, image pickup processing is performed a corresponding number of times of the continuous photographing.

In step S508, the photographing unit 102 performs image pickup processing the number of times corresponding to a photographing mode, and the process advances to step S509. Note that image pickup processing is performed three times in the HDR back-light correction mode. In step S509, one image is generated by combining a plurality of images, obtained by image pickup processing, using the work memory area reserved in step S503. The process then advances to step S510.

In step S510, the control unit 101 displays, on the display unit 106, the image obtained by image pickup processing or combining processing. The process then advances to step S511. In step S511, the generated image is written as image data in the recording medium 110.

Figure 6:
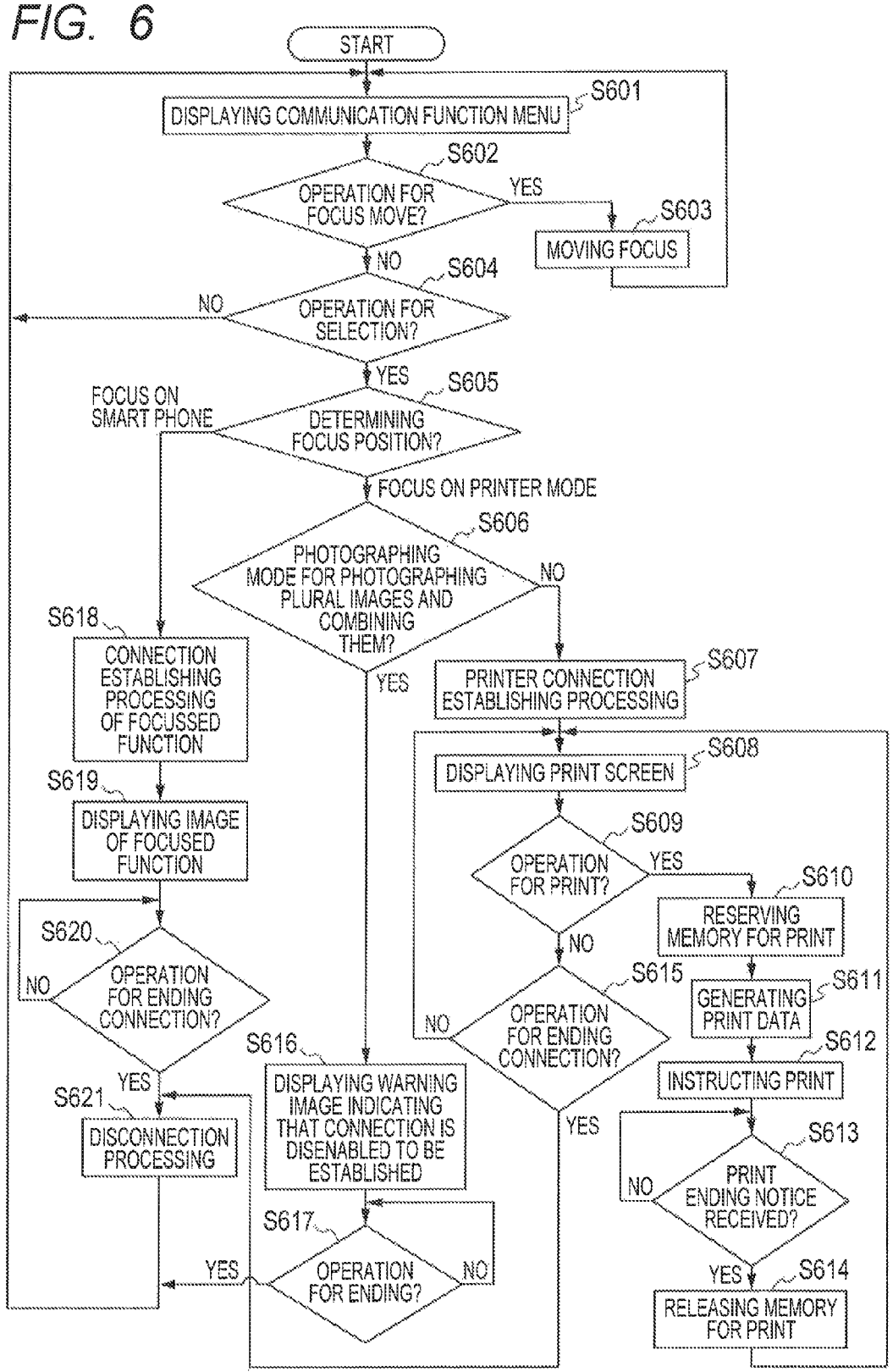
FIG. 6 is a flowchart showing an example of a processing procedure to be performed when the communication function is selected from a communication function menu by the user according to the embodiment.

FIG. 6 is a flowchart showing an example of a processing procedure to be performed when the user selects a communication function from the communication function menu. Note that each processing shown in FIG. 6 is performed under the control of the control unit 101.

First of all, in step S601, the display unit 106 displays the communication function menu shown in FIG. 3 or 4. On this communication function menu screen, one of the smart phone mode and the printer mode is focused. In this state, it is possible to switch the focus position between them by operating the operation unit 105.

Subsequently, in step S602, it is determined whether the user has performed an operation to move the focus between the smart phone mode and the printer mode. If this determination result indicates that the user performs an operation to move the focus, the process advances to step S603. If the user does not perform such an operation, the process advances to step S604. In step S603, the focus is moved between the smart phone mode and the printer mode to update the screen displayed on the display unit 106. The process then returns to step S601.

In step S604, it is determined whether the user performs an operation to select the communication mode focused on the screen. If the determination result indicates that the user performs an operation to select the communication mode, the process advances to step S605. Otherwise, the process returns to step S601. Subsequently, it is determined in step S605 whether the selected mode is the smart phone mode or printer mode. If this determination result indicates that the printer mode is selected, the process advances to step S606. If the smart phone mode is selected, the process advances to step S618.

In step S606, it is determined whether the current photographing mode is a photographing mode for photographing a plurality of images and combining them, such as the HDR back-light correction mode. If this determination result indicates that the current photographing mode is an ordinary photographing mode other than the above photographing mode, the process advances to step S607. If the current photographing mode is a photographing mode for photographing a plurality of images and combining them, the process advances to step S616.

In step S607, the communication unit 109 is controlled to establish connection with the printer 200. At this time, the display unit 106 displays the printer connection establishing screen 304 like that shown in FIG. 3. In step S608, the image selection screen for issuing a print instruction is displayed on the display unit 106.

Subsequently, it is determined in step S609 whether the user performs an operation to issue a print instruction upon selecting an image with the operation unit 105 while a screen for selecting an image to be subjected to printing is displayed. If this determination result indicates that the user performs an operation to issue a print instruction, the process advances to step S610. If the user does not perform such an operation, the process advances to step S615.

In step S610, a memory area for an operation to combine print data is reserved in the work memory 104, and the process advances to step S611. The memory area for an operation reserved in this case is common to a memory area for image combining reserved in step S503 described above. Subsequently, in step S611, print data to be transmitted to the connected printer 200 is generated in the memory area reserved in step S610, and the process advances to step S612.

In step S612, a print start instruction is transmitted, together with the print data generated in step S611, to the connected printer 200 via the communication unit 109. In step S613, the control unit 101 stands by until the reception of a print ending notice from the printer 200. Note that while the control unit 101 stands by, a screen indicating that the display unit 106 is printing is displayed. Upon receiving a print ending notice from the printer 200, the control unit 101 releases in step S614 the work memory area reserved in step S610. The process then returns to step S608.

In step S615, it is determined whether the user performs an operation to end the connection. If this determination result indicates that the user performs an operation to end the connection, the process advances to step S621. If the user does not perform such an operation, the process returns to step S608.

On the other hand, in step S616, the printer connection disenabled screen 404 like that shown in FIG. 4 is displayed on the display unit 106. In step S617, the control unit 101 stands by until the user performs an ending operation by using the operation unit 105. If the user performs an ending operation by using the operation unit 105, the process returns to step S601.

On the other hand, in step S618, the communication unit 109 is controlled to establish connection with the information processing apparatus 400. At this time, a smart phone connection establishing screen like that shown in FIG. 3 or 4 is displayed on the display unit 106. In step S619, a screen after the completion of connection with the smart phone is displayed on the display unit 106. During this period, the information processing apparatus 400 can exchange data with the imaging apparatus 100 so as to acquire, for example, image data recorded in the recording medium 110.

In this manner, as long as transmission takes place for image transfer, the digital camera of the invention can establish connection to an external apparatus even in any one of a photographing mode which requires larger memory area than usual and a photographing mode which photographs an image of one frame by an imaging unit in accordance with one photographing instruction.

However, in a case where the digital camera establishes the connection for print to the external apparatus, there exist a case where the connection to the external apparatus can be established and a case where such connection cannot be established, depending on the photographing mode. In the present embodiment, the digital camera is arranged not to be able to establish the connection for print to the external apparatus in a case of the photographing mode which requires larger memory area than usual, while even in the case of the photographing mode which requires larger memory area than usual, if the connection to the external apparatus is not for print but for image transfer, the digital camera is allowed to establish the connection to the external apparatus.

In step S620, the control unit 101 stands by until the reception of a connection ending operation from the operation unit 105. Upon receiving a connection ending operation, the control unit 101 performs disconnection processing with respect to the device under communication via the communication unit 109 in step S621. After the disconnection, the process returns to step S601.

As has been described above, this embodiment is based on the assumption that both the photographing mode using a large memory area, such as the HDR back-light correction mode, and the communication mode using a large memory area, such as the printer mode, reserve a common memory area. In this case, while the communication mode using a large memory area is selected, control is effected to inhibit connection with an external device to which a large memory area is required for connection with the printer or the like. This can prevent a situation in which the user loses a photo opportunity in a photographing mode using a large memory area, such as the HDR back-light correction mode.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus having a communication interface configured to communicate with an external device comprising:
   a controller; and
   a memory configured to store instructions which, when executed by the controller, cause the imaging apparatus to function as:
   selecting a photographing mode for execution from a first photographing mode and a second photographing mode, wherein a larger memory capacity is necessary for data processing in the second photographing mode than a memory capacity necessary for data processing in the first photographing mode; and
   communicating with a first external device or a second external device through the communication interface, wherein,
   when the first photographing mode is selected as the photographing mode for execution, a communication with both of the first and second external devices is enabled, and,
   when the second photographing mode is selected as the photographing mode for execution, a communication with the first external device is enabled, while a communication with the second external device is disabled.

2. The imaging apparatus according to claim 1, wherein an image for selecting a communications partner is displayed on a display.

3. The imaging apparatus according to claim 2, wherein, when the second photographing mode is selected as the photographing mode for execution, the first external device is selectable as the communications partner, while the second external device is selectable as the communications partner.

4. The imaging apparatus according to claim 1, wherein the first photographing mode is performed to generate one image by one photographing operation.

5. The imaging apparatus according to claim 1, wherein the second photographing mode is performed for image processing of data of a plurality of images acquired by the photographing.

6. The imaging apparatus according to claim 1, wherein the second photographing mode includes at least one of a handheld night scene mode, an HDR back-light correction mode, a multi-shot noise reduction mode, a multi-exposure mode, and a panorama combining mode for generating a horizontal or vertical image.

7. The imaging apparatus according to claim 1, wherein the first external device is a smart phone.

8. The imaging apparatus according to claim 1, wherein the second external device is a printer.

9. A method of controlling an imaging apparatus having a communication interface configured to communicate with an external device, the controlling method comprising:
   selecting a photographing mode for execution from a first photographing mode and a second photographing mode, wherein a larger memory capacity is necessary for data processing in the second photographing mode than a memory capacity necessary for data processing in the first photographing mode; and
   communicating with a first external device or a second external device through the communication interface, wherein,
   when the first photographing mode is selected as the photographing mode for execution, a communication with both of the first and second external devices is enabled, and,
   when the second photographing mode is selected as the photographing mode for execution, a communication with the first external device is enabled, while a communication with the second external device is disabled.

10. The method according to claim 9, wherein an image for selecting a communications partner is displayed on a display.

11. The method according to claim 10, wherein, when the second photographing mode is selected as the photographing mode for execution, the first external device is selectable as the communications partner, while the second external device is selectable as the communications partner.

12. The method according to claim 9, wherein the first photographing mode is performed to generate one image by one photographing operation.

13. The method according to claim 9, wherein the second photographing mode is performed for image processing of data of a plurality of images acquired by the photographing.

14. The method according to claim 9, wherein the second photographing mode includes at least one of a handheld night scene mode, an HDR back-light correction mode, a multi-shot noise reduction mode, a multi-exposure mode, and a panorama combining mode for generating a horizontal or vertical image.

15. The method according to claim 9, wherein the first external device is a smart phone.

16. The method according to claim 9, wherein the second external device is a printer.

* * * * *